(12) United States Patent
Chen

(10) Patent No.: US 7,788,543 B2
(45) Date of Patent: Aug. 31, 2010

(54) METHODS AND SYSTEMS FOR GENERATING AND STORING COMPUTER PROGRAM EXECUTION TRACE DATA

(75) Inventor: Jyhren Jerry Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 505 days.

(21) Appl. No.: 11/388,096

(22) Filed: Mar. 22, 2006

(65) Prior Publication Data

US 2007/0226545 A1 Sep. 27, 2007

(51) Int. Cl.
*G06F 11/00* (2006.01)
(52) U.S. Cl. .................................. 714/45; 717/128
(58) Field of Classification Search .................. None
See application file for complete search history.

(56) References Cited

U.S. PATENT DOCUMENTS

| | | | |
|---|---|---|---|
| 5,487,169 A | 1/1996 | Vraney et al. | |
| 5,513,315 A | 4/1996 | Tierney et al. | |
| 5,784,552 A * | 7/1998 | Bishop et al. | 714/38 |
| 6,003,143 A | 12/1999 | Kim et al. | |
| 6,058,493 A | 5/2000 | Talley | |
| 6,145,123 A * | 11/2000 | Torrey et al. | 717/128 |
| 6,161,216 A | 12/2000 | Shagam | |
| 6,243,836 B1 * | 6/2001 | Whalen | 714/45 |
| 6,418,543 B1 * | 7/2002 | Goli et al. | 714/38 |
| 6,457,144 B1 * | 9/2002 | Eberhard | 714/45 |
| 6,633,973 B1 * | 10/2003 | Kanzaki | 712/227 |
| 6,728,906 B1 * | 4/2004 | Case et al. | 714/45 |
| 6,836,881 B2 * | 12/2004 | Beynon et al. | 717/128 |
| 7,069,544 B1 * | 6/2006 | Thekkath | 717/128 |
| 7,383,428 B2 * | 6/2008 | Bottemiller et al. | 712/227 |
| 7,451,206 B2 * | 11/2008 | Geck et al. | 709/224 |
| 7,484,202 B2 * | 1/2009 | Cheng et al. | 717/120 |
| 2003/0120980 A1 * | 6/2003 | Harris | 714/45 |
| 2004/0006729 A1 * | 1/2004 | Pendurkar | 714/733 |
| 2005/0022068 A1 * | 1/2005 | Billeci et al. | 714/45 |
| 2005/0183069 A1 * | 8/2005 | Cepulis | 717/128 |

OTHER PUBLICATIONS

"Debugging Backwards in Time" from LambdaCS.com, archived as early as Dec. 20, 2002, [http://www.lambdacs.com/debugger/USENIX/Debugger_USENIX_2003.html] and [http://web.archive.org/web/20021220202001/http://lambdacs.com/debugger/USENIX/Debugger_USENIX_2003.html].*
Stolowitz Ford Cowger LLP, Listing of related cases, Nov. 9, 2009.
NEXUS Debugger and Trace for MPC56x, http://www.lauterbach.de/frames.html?nexusppc.html, printed Nov. 9, 2009.
MPC5500 Family Embedded Software Solutions, http://www.ghs.com/products/mpc5554.html, printed from web archived copy of site saved Apr. 6, 2005.
Freescale CodeTEST Software Analysis Tools, http://www.metrowerks.com/MW/Develop/AMC/CodeTEST/default.htm, printed from web archived copy of site saved Sep. 26, 2005.

* cited by examiner

*Primary Examiner*—Gabriel L Chu
(74) *Attorney, Agent, or Firm*—Stolowitz Ford Cowger LLP

(57) ABSTRACT

Methods and systems for generating and storing computer program execution trace data are disclosed. A method includes receiving a signal that enables the generation of computer program execution trace data in accordance with data stored in a register. The computer program execution trace data is generated and stored in memory.

17 Claims, 6 Drawing Sheets

METHODS AND SYSTEMS FOR GENERATING AND STORING COMPUTER PROGRAM EXECUTION TRACE DATA

TECHNICAL FIELD

Embodiments of the present invention pertain to methods and systems for generating and storing computer program execution trace data.

BACKGROUND ART

Computer programs employ the capabilities of a computer system to execute tasks that computer system user's desire performed. Typical examples of computer programs are word processors, spreadsheets and media players. Many computer programs have user interfaces that allow a computer system user to easily use and interact with the computer program.

Computer programs can contain errors or portions that do not operate desirably. These portions are called "bugs". Bugs can arise from mistakes and errors that are present either in a computer program's source code or in it's design. Reports regarding program bugs in a computer program are referred to as bug reports, trouble reports, change requests, etc.

It should be appreciated that bugs can have a wide variety of effects that can result in varying levels of inconvenience to the user of the computer program. In many cases bugs can have only a slight effect on the computer programs functionality. Consequently, such bugs lie undetected for long periods of time. However, more serious bugs may cause the computer program to either crash or freeze.

Moreover, bugs can lead to security problems. For example, a bug causing a buffer to overflow can allow a malicious user to execute computer programs that are normally not allowed to run. Such bugs that provide access to programs that are normally prohibited can represent a serious threat to the security of affected computer systems.

Many computer software engineers and programmers use debuggers to investigate such computer bugs. Debuggers are computer programs that are used to debug other computer programs. Many debuggers are provided with the capacity to halt a computer program upon the occurrence of specific conditions. Such debuggers can offer sophisticated functions such as running a computer program step by step (single-stepping), stopping at the occurrence of an event, and tracking the values of variables.

There are several conventional approaches to collecting data for use in the debugging of computer programs. Some of the approaches involve the collection of computer program execution trace data that is generated by a computer system CPU. Modern CPUs that comply with the IEEE Nexus specification can be configured to provide computer program execution trace data. In one conventional approach, a probe is used to collect the computer program execution trace data in real time.

A significant disadvantage of conventional systems is that they can only single step forward through code. In addition, many conventional systems require external debuggers, which add overhead. In addition, many of such approaches require the re-compilation of the code.

BRIEF DESCRIPTION OF THE DRAWINGS

The accompanying drawings, which are incorporated in and form a part of this specification, illustrate embodiments of the invention and, together with the description, serve to explain the principles of the invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

Notation and Nomenclature

Some portions of the detailed descriptions which follow are presented in terms of procedures, logic blocks, processing, and other symbolic representations of operations on data bits within a computer system, server system or electronic computing device. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

In the detailed description of embodiments of the invention to follow the term "computer program execution trace data" is intended to refer to data that provides characteristics of the execution of computer program code. Moreover, the phrase "directs the provision of access to computer program execution trace data" is intended to refer to the causing of computer program execution trace data to be made accessible to authorized requestors.

Figure 1:
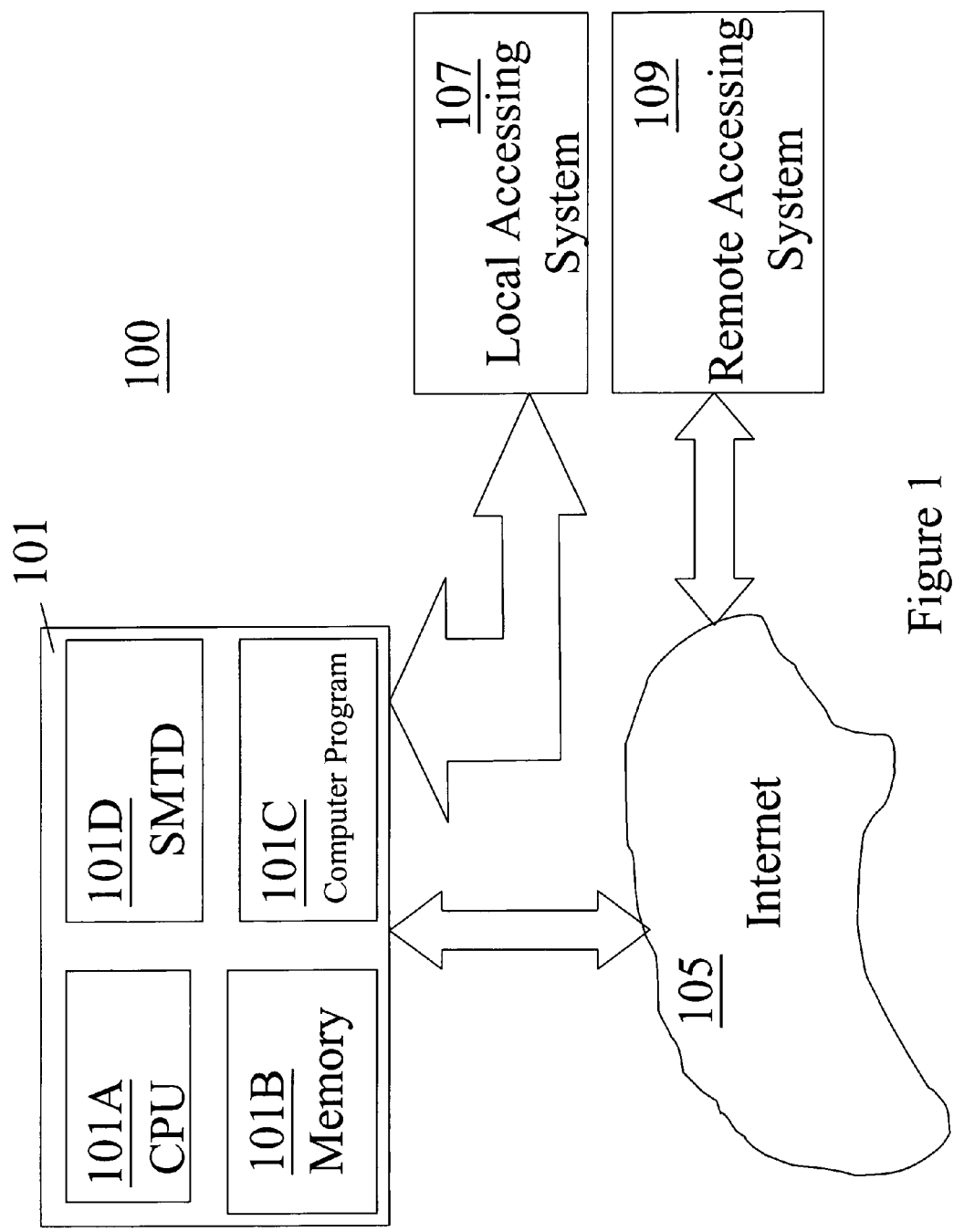
FIG. 1 shows the components of a network that includes a target system and computer program execution trace data accessing systems according to one embodiment of the present invention.

Network Environment of System for Generating and Storing Computer Program Execution Trace Data According to Embodiments of the Present Invention FIG. 1 shows the components of a network 100 that includes both a target system 101 and computer program execution trace data accessing systems according to one embodiment of the present invention. In one embodiment, network 100 can accommodate the dissemination of computer program execution trace data that is generated by a CPU of the target system that can be stored in memory of the target system 101. In one embodiment, stored computer program execution trace data can assist in the debugging of a computer program to which the computer program execution trace data corresponds.

As shown in FIG. 1, target system 101 includes CPU 101A, memory 101B, computer program 101C and system 101D for managing the generation and access of computer program execution trace data (SMTD). Also shown in FIG. 1 are Internet 105, local computer program execution trace accessing system 107 and remote computer program execution trace accessing system 109.

Referring to FIG. 1, target system 101 includes a CPU 101A that has the capacity to write computer program execution trace data that corresponds to the execution of computer program 101C to memory units 101B. In one embodiment, the message format of the computer program execution trace can be compliant with the Nexus IEEE specification. In another embodiment, the message format of the computer program execution trace can be compliant with another CPU specification. In one embodiment, target system 101 can be a router. In another embodiment, target system 101 can be any other type system with a CPU and memory upon which a resident computer program executes and computer program execution trace data is written by the CPU to the memory.

In one embodiment, at predefined points during the execution of computer program 101C program trace data can be written to memory units 101B. In one embodiment, memory units 101B can include but is not limited to a circular buffer. In other embodiments, other type memory can be used.

The messages that are written to memory units 101B by CPU 101A can then be analyzed for debugging purposes. It should be appreciated that, in one embodiment, the enabling and disabling of the generation and storage of computer program execution trace data can be triggered by system 101D.

In one embodiment, subsequent to the writing of computer program trace data to memory units 101B, the computer program trace data can be accessed by a local accessing system 107 or a remote accessing system 109. In one embodiment, once the trace data is accessed, debugging systems associated with the remote accessing system or the local accessing system can be used to analyze the trace data to assist in debugging computer program 101C.

In one embodiment, as previously discussed, CPU 101A can be provided with the capacity to write computer program execution trace data to memory 101B (e.g., a circular buffer portion of main memory or SRAM). In one embodiment, this computer program execution trace data can be dumped out by system 101D. In one embodiment, after computer program trace data is caused to be dumped by system 101D, as discussed above, the computer program execution trace data can be analyzed to accommodate debugging.

In one embodiment, to accommodate the management of the generation, storage and access of execution trace data storage, CPU 101A can include: (1) a starting address register, (2) an ending address register, (3) a next pointer register, (3) a trace control register, and (4) a status register. These structures are described herein in detail with reference to FIG. 3.

In one embodiment, the control register can accommodate the enabling or disabling of computer program execution trace data generation. Moreover, in one embodiment, the current status of the computer program execution trace (being generated or not) can be reflected in the status register. In one embodiment, the next pointer register is employed to identify the location in memory where the CPU is to dump the next message. In one embodiment, the memory where the next message is dumped can be part of main memory and can be implemented using DRAM or SRAM technology.

In one embodiment, system 101D can include a user interface that allows a user to enable or disable computer program execution trace data generation. In one embodiment, computer program execution trace data generation can also be stopped automatically by some exception handlers such as a watchdog exception handler or a crash exception handler. In one embodiment, a user can dump out memory that contains the computer program execution trace data (e.g., a circular buffer) manually. In another embodiment, the memory can be dumped automatically similarly to the manner in which crash info for an Internetwork Operating System (IOS) is collected.

In operation, where the system supports mapping of trace data to memory locations, upon receiving a request for computer program execution trace data, system 101D can direct the provision of access to authorized parties desiring access to the stored computer program trace data. In other embodiments, where only manual access of computer program trace data is available manual retrieval of the computer program trace data can be allowed. As discussed above, the computer program execution trace data can be requested and accessed by either local or remote accessing systems (e.g., 107 and 109). Additionally, as also is discussed above, in one embodiment, the computer program trace execution data can be provided automatically. In another embodiment, the computer program trace execution data can be provided at the prompting of a system user. Authorized requesters can access the computer program trace execution data and use it to debug the corresponding computer program.

Advantages of the invention include the ability to use generated and stored CPU computer program execution trace data to analyze the execution of program code. It can be used with a debugger such as a gnu debugger (gdb) to single step backwards through program code thus significantly assisting software engineers in the debugging of program code. However, it should be appreciated that embodiments of the invention do not require an external debugger.

It should be appreciated that the herein discussed computer program execution trace generating functionality does not add overhead when it is disabled. In one embodiment, the size of the memory used to store the computer program execution trace (e.g., a circular buffer) can be tuned. In one embodiment, re-compilation of the computer program code is not required.

Figure 2:
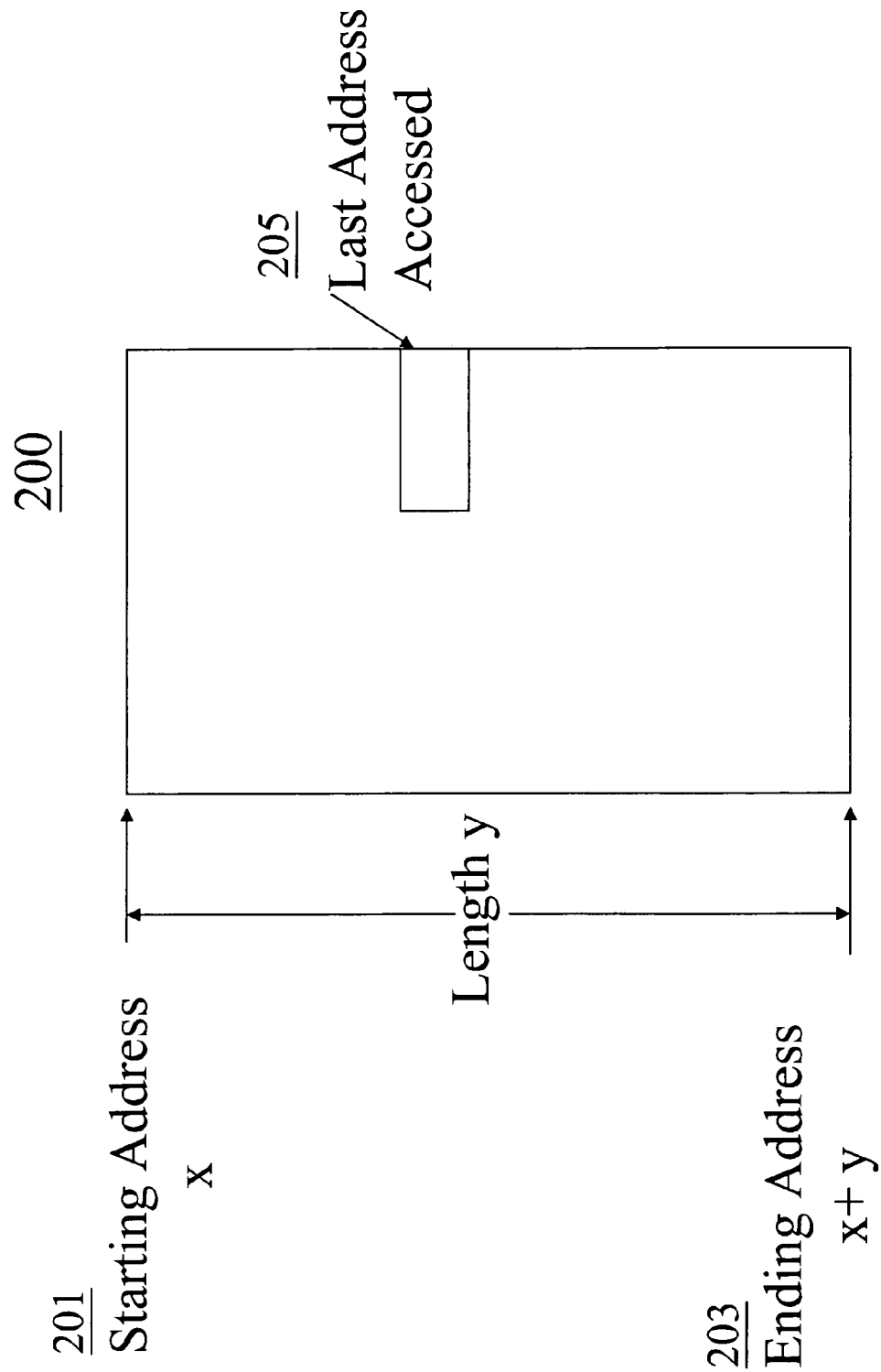
FIG. 2 shows a section of memory for storing computer program execution trace data that has particular locations identified therein according to one embodiment of the present invention.

FIG. 2 illustrates a section of memory 200 used for storing computer program execution trace data that has particular locations identified therein according to one embodiment of the present invention. FIG. 2 shows starting address 201, ending address 203, last accessed address 205 and buffer length 207.

Referring to FIG. 2, starting address 201 is the initial address among a series of contiguous addresses where an intact line of program trace information is stored. Ending address 203 is the last address among a series of contiguous addresses where program trace information is stored. Last accessed address 205 is the last address from which program trace information is accessed.

As discussed above memory 200 can be implemented using a circular buffer. In one embodiment, also as is discussed above the circular buffer can have the capacity to be tuned.

Figure 3:
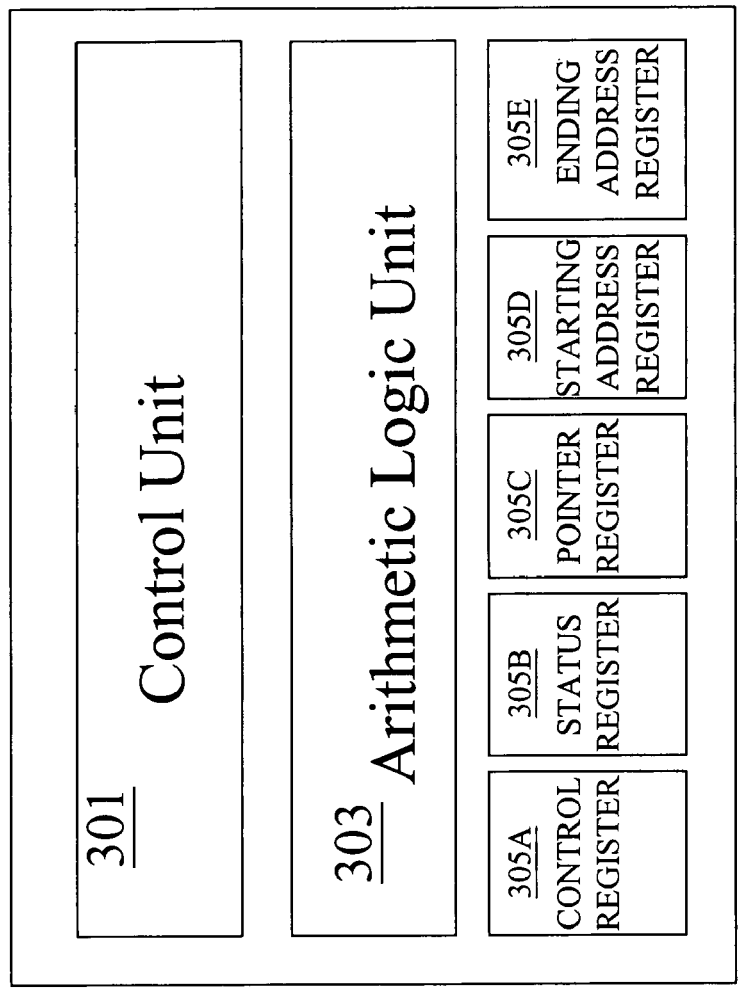
FIG. 3 shows a CPU is provided with dedicated registers for controlling computer program execution trace storage according to one embodiment of the present invention.

FIG. 3 shows a CPU 300 that is provided with dedicated registers for controlling the generation and storage of a computer program execution trace according to one embodiment of the present invention. In one embodiment, by means of the dedicated registers, CPU 300 is enabled to write computer program execution trace information to associated memory which can be retrieved for use in the debugging of the computer program. In one embodiment, the message format of the computer program execution trace can be compliant with the IEEE Nexus specification. In other embodiments, the message format of the computer program execution trace can be compliant with another specification. In the FIG. 3 embodiment, CPU 300 includes control unit 301, arithmetic logic unit 303, and dedicated registers 305A-305E.

Referring to FIG. 3, control unit 301 directs and coordinates computer operations according to instructions of one or more computer programs stored in a memory of a computer system (e.g., 101 in FIG. 1). Arithmetic logic unit 303 performs mathematical and logical operations.

CPU storage units 305 include dedicated storage registers 305A-305E. In one embodiment, dedicated storage registers 305A-305E are provided as a part of CPU storage units 305 for controlling computer program execution trace data generation and storage. Dedicated storage registers 305A-305E include control register 305A, status register 305B, pointer register 305C, starting address register 305D and ending address register 305E.

Referring again to FIG. 3, the control register 305A is configured to allow computer program execution trace generation capability to be enabled or disabled. Moreover, the current status of computer program execution trace generation can be reflected in status register 305B. In one embodiment, next pointer register 305C identifies the location in memory where CPU 300 is to dump the next computer program execution trace message. Moreover, in one embodiment, starting address register 305D and ending address register 305E identify the respective starting and ending addresses of messages that belong to a stored computer program execution trace.

In one embodiment, optional control fields that can be employed include but are not limited to supervisor mode and user mode, process ID, and core select (e.g., 32 bit mask for 32 cores). Using these fields, a user can narrow down the events that they want to trace, e.g., trace generation is carried out when the CPU 300 is in either supervisor or user mode, or when the CPU is executing code for a certain process, or for a particular core.

Consequently, registers 305A-305E are configured to store information that is involved in the enabling of trace generating processes, the directing of the storing of trace information in memory, the designating of the locations in memory for storing trace information and the indicating the status of computer program execution trace generation.

In one embodiment, CPU 300 can be an embedded processor. In other embodiments CPU 300 can be other processor types. In operation, software (e.g., 101D in FIG. 1) can be used to prompt CPU 300 via control register 305A to begin to generate a computer program execution trace. Similarly, software (e.g., 101D in FIG. 1) can be used in the ascertainment of information related to the status of computer program execution trace generation.

Figure 4:
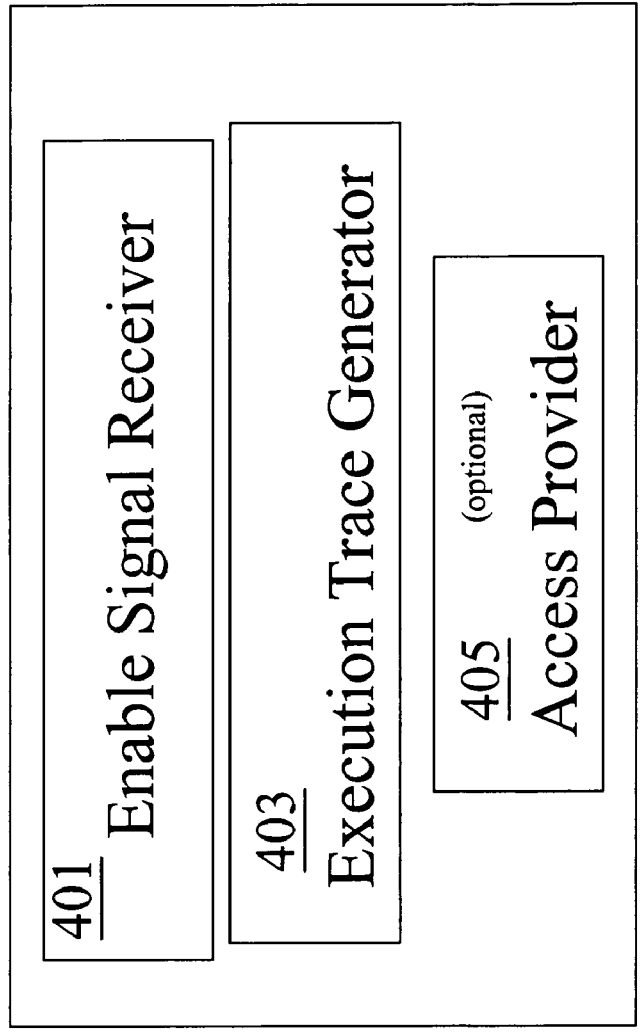
FIG. 4 shows components of a system for managing the generation and access of computer program execution trace data according to one embodiment of the present invention.

System for Generating and Storing Computer
Program Execution Trace Data According to One
Embodiment of the Present Invention FIG. 4 shows components of a system 101D for managing the generation and access of computer program execution trace data according to one embodiment of the present invention. In one embodiment system 101D, manages the generation and access of computer program execution trace information that can be stored in memory and that can be used in the debugging of a computer program to which the program trace information corresponds. In one embodiment, system 101D manages the enabling, disabling and dumping of computer program execution trace information.

In one embodiment, components of system 101D can be implemented in hardware or in software or a combination of both. In the FIG. 4 embodiment, system 101D components include execution trace generation signal receiver 401, execution trace generation enabler/disabler 403 and execution trace access director 405.

Referring to FIG. 4, execution trace enable signal receiver 401 receives a trigger that prompts the enabling of the generation of execution trace data.

Execution trace generation enabler/disabler 403 enables and disables the generation by a processor of processor computer program execution trace data by means of a control register in the processor. In exemplary embodiments, processor computer program execution trace data is written to memory associated with the processor (e.g., a circular buffer). As discussed above, other registers that are provided as a part of the processor can designate the execution trace starting address, the ending address, and the address to which the next message will be dumped. In addition, a status register can indicate whether an execution trace is currently being generated (status).

Execution trace access director 405 (optional) directs the provision of access to (causes to be accessible to authorized requestors of access) computer program execution trace messages that are written to a memory (e.g., 101B in FIG. 1). In one embodiment, providing access to requestors can be employed where mapping of the trace data to memory locations is supported. Where mapping of the trace data to memory locations is not available manual retrieval of the trace data can be necessary. In one embodiment, execution trace access director 405 directs the provision of access to computer program execution trace messages either in response to a request from a user or automatically according to a predefined scheme.

In operation, system 101D can include an associated interface that can accommodate user inputs that prompt execution trace generation enabler/disabler 403 to initiate the generation of computer program execution trace data. Moreover, in one embodiment, via the associated interface, the status of the generation of computer program execution trace data can be checked. In one embodiment, a user can control the dumping of computer program execution trace data via the interface.

Figure 5:
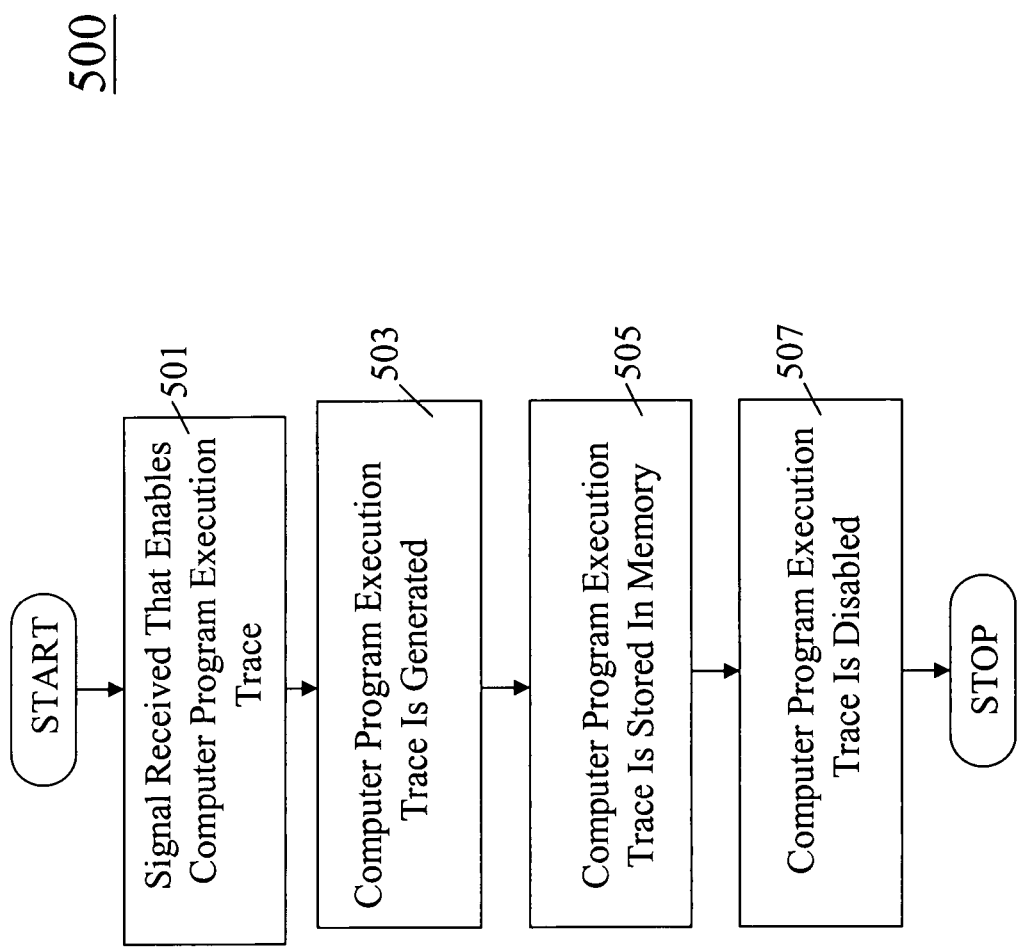
FIG. 5 shows a flowchart of steps in a method for generating and storing computer program execution trace data according to one embodiment of the present invention.

Exemplary Operations of Method for Generating and Storing Computer Program Execution Trace Data According to Embodiments of the Present Invention FIG. 5 shows a flowchart 500 for generating and storing computer program execution trace data according to one embodiment of the present invention. The flowchart includes processes of the present invention which, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 5, at step 501, a signal is received that enables the generation of computer program execution trace data. In one embodiment, the signal is received by a processor. In one embodiment, an execution trace generation enabler/disabler (e.g., 403 in FIG. 4) provides the signal that enables the generation of computer program execution trace data by means of a control register in the processor. In exemplary embodiments, computer program execution trace data can be written to a circular buffer.

At step 503, the computer program execution trace data is generated. And, at step 505, the computer program execution trace data is stored in specified memory locations of a computer system. In one embodiment, the locations are determined by a processor starting address register and ending address register (see FIG. 3).

It should be appreciated that registers with which the processor can be provided can determine the computer program execution trace data storage starting address, ending address, and the address to which the next message will be dumped. In addition, a processor register can be provided to indicate whether computer program execution trace data is currently being generated (status).

At step 507, computer program execution trace generation is disabled.

Exemplary Hardware in Accordance with Embodiments of the Present Invention

Figure 6:
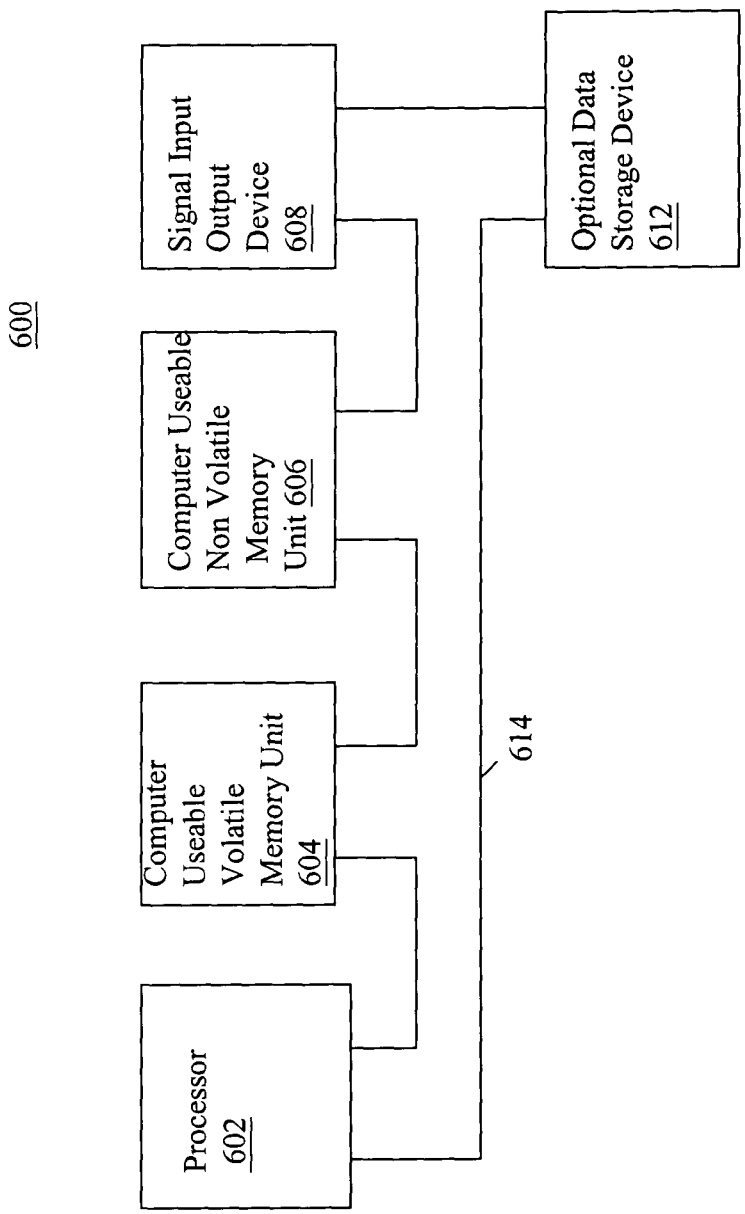
FIG. 6 is a block diagram of an exemplary computer system in accordance with embodiments of the present invention.

FIG. 6 is a block diagram of an exemplary computer system 600 in accordance with embodiments of the present invention. System 600 may be well suited to be any type of electronic computing device (e.g., server computer, embedded computing device, portable computing system etc.). Within the following discussions herein, certain processes and steps are discussed that are realized, in some embodiments, as a series of instructions (e.g., software program) that reside within computer readable memory units of computer system 600 and executed by a processor(s) of system 600. When executed, the instructions cause computer 600 to perform specific actions and exhibit specific behavior which is described in detail below. According to one embodiment, the instructions may include code that when executed perform the method for generating and storing computer program execution trace data described herein (see FIG. 5).

Computer system 600 of FIG. 6 comprises an address/data bus 614 for communicating information, one or more central processors 602 coupled with bus 614 for processing information and instructions. Central processor unit 602 may be a microprocessor or any other type of processor. The computer 600 also includes data storage features such as a computer usable volatile memory unit 604 (e.g., random access memory, static RAM, dynamic RAM, etc.) coupled with bus 614 for storing information and instructions for central processor(s) 602, a computer usable non-volatile memory unit 606 (e.g., read only memory, programmable ROM, flash memory, EPROM, EEPROM, etc.) coupled with bus 614 for storing static information and instructions for processor(s) 602. System 600 also includes one or more signal generating and receiving devices 608 coupled with bus 614 for enabling system 600 to interface with other electronic devices. The communication interface(s) 608 of the present embodiment may include wired and/or wireless communication technology such as a wireless telephone circuitry. For example, in some embodiments, the communication interface 608 is a serial communication port, but could also alternatively be any of a number of well known communication standards and protocols, e.g., Universal Serial Bus (USB), Ethernet, FireWire (IEEE 1394), parallel, small computer system interface (SCSI), infrared (IR) communication, Bluetooth wireless communication, broadband, and the like.

The system 600 may also include a computer usable mass data storage device 612 such as a magnetic or optical disk and disk drive (e.g., hard drive or floppy diskette) coupled with bus 614 for storing information and instructions.

In accordance with exemplary embodiments thereof, methods and systems for generating and storing computer program execution trace data are disclosed. A method includes receiving a signal that enables the generation of computer program execution trace data in accordance with data stored in a register. The computer program execution trace data is generated and stored in memory.

In addition, a processor is disclosed. The processor includes a control unit for directing and coordinating computer system operations according to the instructions of one or more computer programs stored in a memory of the computer system. Moreover, the processor includes an arithmetic logic unit for performing mathematical and logical operations. Additionally, the processor includes storage units that include dedicated storage units dedicated to storing information for enabling the processor to generate computer program execution trace data. The computer program executes on the processor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for debugging a code of a computer program, comprising:

executing the computer program with a processor operating in a router;

generating, with the processor, trace data associated with the computer program, wherein the processor includes a control register to identify conditions that, when met, cause the processor to generate the trace data, and a status register, separate from the control register, to identify when the processor is currently generating trace data;

storing the trace data in a memory device, wherein the processor includes a next pointer register to store an address for the trace data to be stored in memory device;

receiving a request to receive the trace data stored in the memory device from a remote processing device; and automatically providing the remote processing device access to the trace data stored in the memory device over a network responsive to the request, wherein the processor includes a starting address register to identify a starting address of the trace data stored in the memory device and includes an ending address register to identify an ending address of the trace data stored in the memory device, wherein the starting address and ending address map the trace data to the memory device, wherein the processor is configured to provide access to the trace data based on the mapping by the starting address and ending address, and wherein the remote processing device is configured to perform debugging operations on the code of the computer program according to the received trace data.

2. The method of claim 1, wherein the memory device implements a tunable circular buffer having a section mapped to values in the starting address register and the ending address register.

3. The method of claim 1, further comprising:
managing access of the trace data through an enable signal receiver that receives a trigger prompting the processor to generate the trace data;
managing an execution trace controller to enable or disable the processor to generate the trace data through the control register embedded in the processor; and
controlling an access provider to provide authorized requestors access to trace messages that are written to the memory device in response to the request.

4. The method of claim 1, further comprising single-stepping backwards through the code with a debugger.

5. The method of claim 4, wherein the debugger is a gnu debugger.

6. A router, comprising:
a computer readable memory unit located within the router; and
a processor located within the router and coupled to the computer readable memory unit, wherein the processor is configured to execute a computer program, and wherein the processor includes:
 a control register to identify conditions that, when met, cause the processor to generate trace data associated with the computer program;
 a status register, separate from the control register, to identify when the processor is currently generating trace data;
 a next pointer register having an address for the trace data to be stored in computer readable memory unit; and
 a starting address register to identify a starting address of the trace data stored in the computer readable memory unit and an ending address register to identify an ending address of the trace data stored in the computer readable memory unit, wherein the starting address and ending address map the trace data to the computer readable memory unit, wherein the processor is configured to provide a remote processing device access to the trace data based on the mapping by the starting address and ending address, and wherein the remote processing device is configured to perform debugging operations on the code of the computer program according to received trace data.

7. The router of claim 6, wherein the trace data is stored by a circular buffer.

8. The router of claim 6, wherein the processor is configured to automatically cease generating trace data when prompted by a watch dog or a crash exception handler.

9. The router of claim 6, wherein the processor is configured to single-step backwards through the code with a debugger.

10. The router of claim 9, wherein the debugger is a gnu debugger.

11. The router of claim 6, wherein the control register comprises control fields that include a supervisor mode, a user mode, a process ID, and a processor core selection.

12. A network processing device, comprising:
a control unit for directing and coordinating computer operations according to instructions of one or more computer programs stored in a memory of a computer system;
an arithmetic logic unit for performing mathematical and logical operations;
a control register to identify conditions that, when met, cause at least one of the control unit or the arithmetic logic unit to generate trace data associated with the one or more computer programs;
a status register, separate from the control register, to identify when the at least one of the control unit or the arithmetic logic unit is currently generating trace data;
a next pointer register having an address for the trace data to be stored in the memory; and
a starting address register to identify a starting address of the trace data stored in the memory and an ending address register to identify an ending address of the trace data stored in the memory, wherein the starting address and ending address map the trace data to the memory, wherein at least one of the control unit or the arithmetic logic unit is configured to provide a remote processing device access to the trace data based on the mapping by the starting address and ending address, and wherein the remote processing device is configured to perform debugging operations on the code of the computer program according to received trace data.

13. The network processing device of claim 12, wherein the control register includes at least one of a supervisor mode field, a user mode field, a process ID field, or a processor core selection field.

14. A system for debugging a code of a computer program comprising:
means for executing the computer program;
means for generating trace data associated with the computer program, wherein the means for generating includes a control register to identify conditions that, when met, cause the means for generating to generate the trace data, and wherein the means for generating includes a status register, separate from the control register, to identify when the means for generating is currently generating trace data;
means for storing the trace data in a memory device, wherein the means for generating includes a next pointer register having an address for the trace data to be stored in memory device; and
means for receiving a request to receive the trace data stored in the memory device from a remote processing device; and means for automatically providing the remote processing device access to the trace data stored in the memory device over a network responsive to the request, wherein the means for generating includes a starting address register to identify a starting address of the trace data stored in the memory device and includes an ending address register to identify an ending address of the trace data stored in the memory device, wherein the starting address and ending address map the trace data to the memory device, wherein the means for automatically providing is configured to provide access to the trace data based on the mapping by the starting address and ending address, and wherein the remote processing device is configured to perform debugging operations on the code of the computer program according to the received trace data.

15. The system of claim 14, further comprising:
means for single-stepping backwards through the code with a debugger.

16. The system of claim 15, wherein the debugger is a gnu debugger.

17. The system of claim 14, wherein the control register comprises control fields that include a supervisor mode, a user mode, a process ID, and a processor core selection.

* * * * *

UNITED STATES PATENT AND TRADEMARK OFFICE
CERTIFICATE OF CORRECTION

PATENT NO. : 7,788,543 B2
APPLICATION NO. : 11/388096
DATED : August 31, 2010
INVENTOR(S) : Chen Page 1 of 1

It is certified that error appears in the above-identified patent and that said Letters Patent is hereby corrected as shown below:

Column 10, line 32  In Claim 12, delete "haying" and insert
-- having --, therefor.

Signed and Sealed this
Thirty-first Day of May, 2011

David J. Kappos
*Director of the United States Patent and Trademark Office*